United States Patent [19]

Standish

[11] Patent Number: 5,396,762

[45] Date of Patent: Mar. 14, 1995

[54] THRUST REVERSAL ASSEMBLY FOR CONTROLLING SIDEWARDLY DIVERTED FLOW

[75] Inventor: Robert R. Standish, Gazeran, France

[73] Assignee: Societe de Construction des Avions Hurel-Dubois, Meudon La Foret, France

[21] Appl. No.: 160,424

[22] Filed: Dec. 1, 1993

[30] Foreign Application Priority Data

Dec. 4, 1992 [FR] France ................. 92 14615

[51] Int. Cl.⁶ ............................................. F02K 3/02
[52] U.S. Cl. ........................ 60/226.2; 244/110 B; 239/265.19; 239/265.23
[58] Field of Search ........................ 60/226.2, 230; 239/265.19, 265.23, 265.25, 265.27, 265.29; 244/110 B

[56] References Cited

U.S. PATENT DOCUMENTS

| | | | |
|---|---|---|---|
| 3,303,653 | 2/1967 | Hull, Jr. ................. | 60/226.2 |
| 3,500,644 | 3/1970 | Hom et al. ............. | 60/226.2 |
| 4,216,923 | 8/1980 | Harris ................... | 239/265.27 |
| 4,732,535 | 3/1988 | Tubbs ................... | 60/226.2 |
| 4,894,985 | 1/1990 | Dubois et al. .......... | 239/265.29 |
| 5,090,197 | 2/1992 | Dubois ................. | 60/226.2 |
| 5,228,641 | 7/1993 | Remlaoui .............. | 60/226.2 |
| 5,284,015 | 2/1994 | Carimali et al. ....... | 60/226.2 |

FOREIGN PATENT DOCUMENTS

| 0301955 | 2/1989 | European Pat. Off. ......... 60/226.2 |
|---|---|---|
| 2687733 | 8/1993 | France . |

Primary Examiner—Richard A. Bertsch
Assistant Examiner—Howard R. Richman
Attorney, Agent, or Firm—Charles E. Baxley

[57] ABSTRACT

The invention relates to thrust reversers with doors for a jet engine. The upstream edge of the reverser doors is equipped with a deflecting structure consisting of a rigid frame (10, 12, 13) fixed to the door and delimiting a space (14) capped by a stiffener (15). In the space (14) are housed vanes (16) with aerodynamic profile in the form of a wing which is inclined by an angle a with respect to the plane of the frame (10, 12, 13) in order to orient laterally the flow of the gases which is diverted by the reverser. This arrangement makes it possible to reduce, or even to prevent, re-ingestion by the engine of the diverted gases, or interference of the latter with the wing structure of the aircraft.

8 Claims, 5 Drawing Sheets

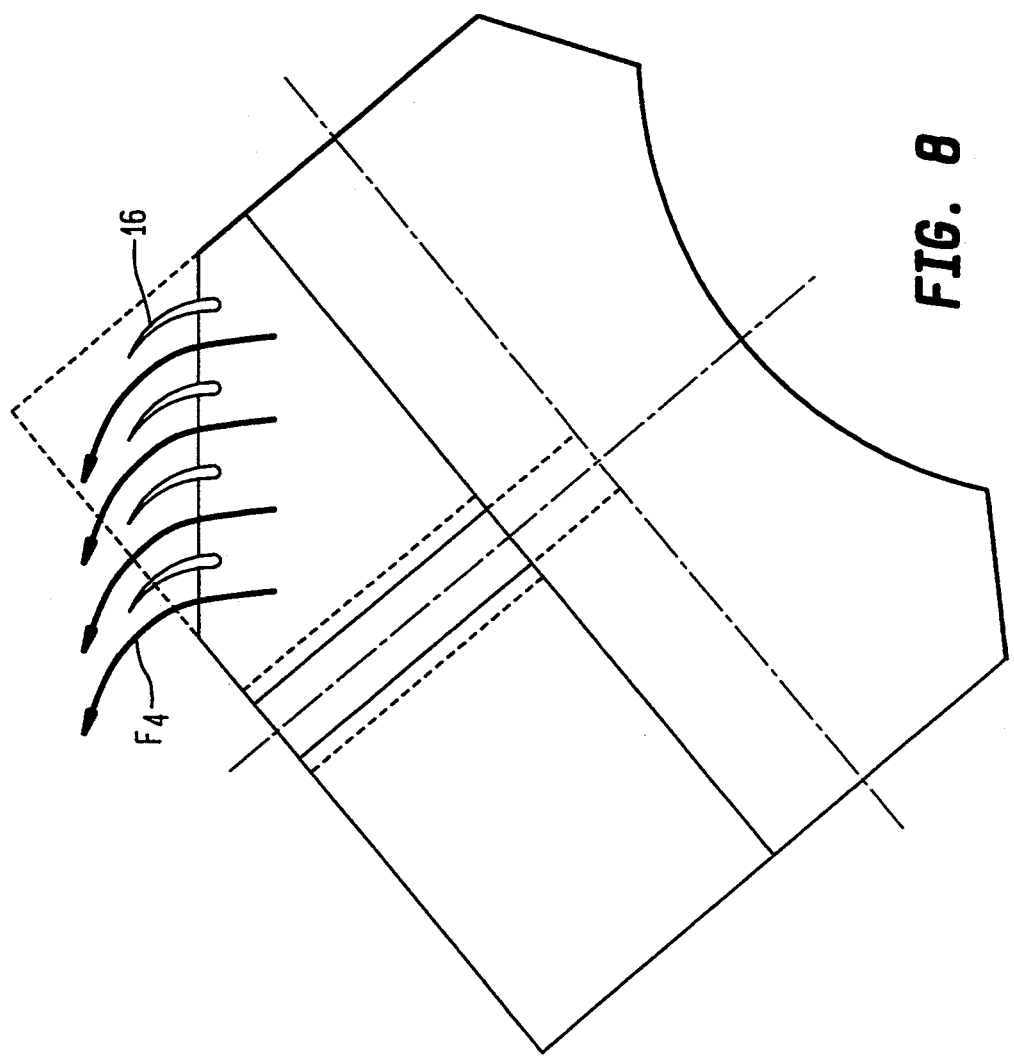

THRUST REVERSAL ASSEMBLY FOR CONTROLLING SIDEWARDLY DIVERTED FLOW

BACKGROUND OF INVENTION

The present invention relates to a thrust reverser, of a type with pivoting doors, and intended to equip a jet engine. In this known type of reverser, the doors are designed to move between two positions, namely a cruising position in which they constitute fairing elements for an ejection duct which accommodates flow of gases from upstream to downstream, and a thrust-reversal position in which the doors, after pivoting, at least partially close off the ejection duct and divert a stream of at least a portion of the gases sidewardly and toward a forward flight direction.

More particularly, the invention teaches an improvement to known doors of a thrust reverser. In order to help with the reversal and guidance of the diverted stream, at least one deflecting structure is provided for one of the doors, extending more or less perpendicularly to the door starting from an internal face of the latter, the deflecting structure being located at an upstream end of the door and/or on a lateral edges of the latter. There already has been proposed, particularly in French Patent Application No. 92 02230 filed on 22 Feb. 1992 in the name of the Applicant's Assignee Company, a deflecting structure configuration which is intended to provide a control of the direction of the diverted stream, this deflecting structure being intended to prevent a phenomenon of re-ingestion by the engine and/or interference of the diverted stream with the structures, particularly the wing structure of the aircraft.

The solution described in said prior patent application comprises forming, in the thickness of a deflecting structure (in the form of a plate), a series of openings of organized profiles which make it possible to impose a prearranged orientation on stream of the diverted flow of gases.

Although such an arrangement has proven to be generally effective, it has limits for some design conditions, particularly for engines arranged under wing structures, which engines require the diverted streams to be oriented at much more acute angles.

SUMMARY OF THE INVENTION

A novel configuration of the deflecting structure of the present invention has the purpose of responding to this limitation. A thrust reverser according to the present invention provides a deflecting structure that comprise a rigid frame composed of:
- a sole plate fixed to the edge of the door,
- a transverse stiffener assembled in spaced relationship from said sole plate and delimiting, with it, a space or passage, and
- a series of deflecting vanes, housed in said space, between the sole plate and the stiffener, and fixed to said sole plate and to said stiffener.

Of course, FR-A-2,681,101 discloses a thrust reverser in which its doors include a deflecting structure 13 (or spoiler) which is perpendicular to its door (FIGS. 4 and 5), but this deflecting structure is solid and elements in the form of vanes 23 are fixed between the structure 13 and a bottom of the door. Flow of gases cannot, according to that patent, pass through the structure 13 between the vanes which are not housed in a space formed between a separated stiffener and a sole plate. In the embodiment of FIG. 7 of FR-A-2,681,101, the elements 123 in the form of vanes project from the bottom of the door. There is no empty passage between the vanes allowing the flow to pass through the door.

Advantageously, according to the present invention, the transverse stiffener forms one piece with the sole plate so as to comprise a rigid frame, the sole plate having at its two ends lateral members delimiting with the sole plate a U-shaped space in which the vanes are housed, the transverse stiffener being fixed to the free ends of the lateral members.

In order to obtain a particularly effective orientation effect for the diverted stream, the deflecting vanes have an aerodynamic profile in the form of a wing. A preferably rounded leading edge of said wing is oriented toward the inside of the door, and the trailing edge of said wing is located in the same plane as the sole plate of the deflecting structure.

The vanes are substantially parallel to each other and are inclined by an angle lying between 0° and 70° with respect to the normal to the plane of the sole plate (angle of attack). Likewise, the geometric center of the end of each vane connected to the sole plate is offset with respect to the geometric center of the end of the vane connected to the stiffener by an angle lying between 0° and 30°.

Moreover, the transverse stiffener will advantageously have a cross-section in the form of a wing with rounded leading edge oriented toward the inside of the door and trailing edge located in the same plane as the trailing edges of the vanes.

BRIEF DESCRIPTION OF THE DRAWINGS

Other features of the invention will emerge during a description of one embodiment of the present invention with reference to appended drawings in which:

FIG. 8 represents a deployed reverser door equipped with the system of the invention.

FIG. 9 represents an aircraft equipped with engines located on the fuselage.

DESCRIPTION OF PREFERRED EMBODIMENTS

Figure 1:
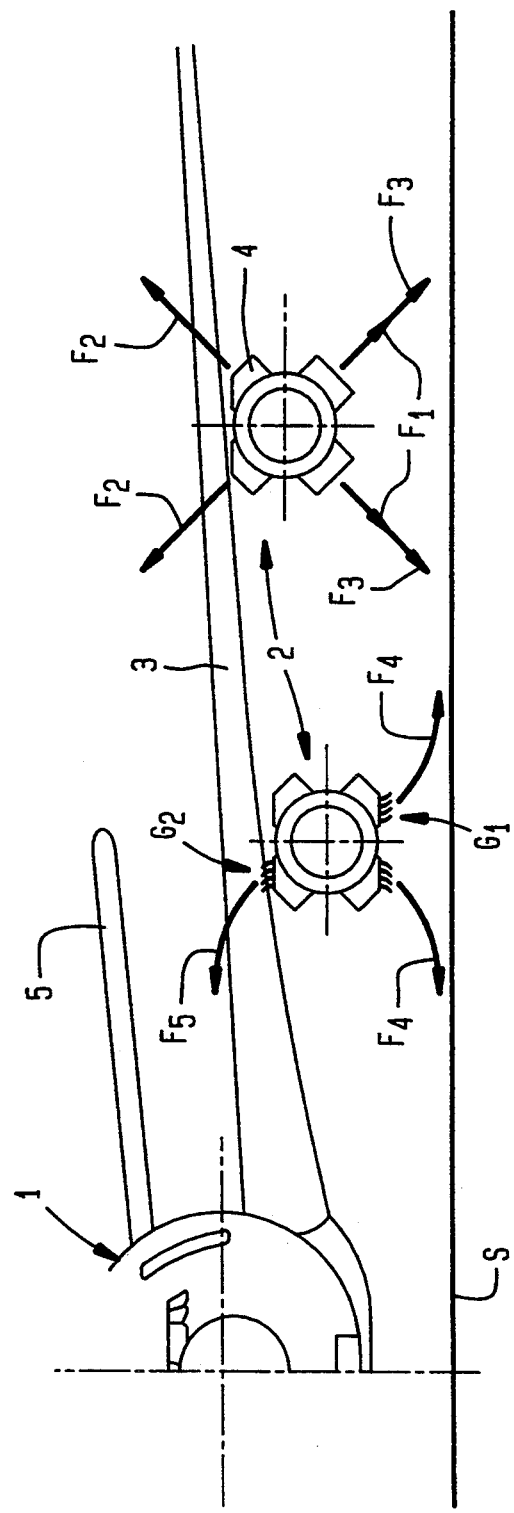
FIG. 1 diagrammatically represents an aircraft equipped with engines located under a wing structure and to which the present invention is suited.

FIG. 1 diagrammatically represents, face on, a right-hand portion of a jet aircraft 1 of a type with engines 2 which are suspended under wings 3 of the aircraft. During landing, the aircraft runs along the ground S and thrust reversers with doors 4 of the engines are deployed in a thrust reversal position. As is seen on the right-hand engine of FIG. 1, which is assumed not to be equipped with the system for guiding the stream which forms the subject of the invention, the direction of the reversed flow is embodied by the arrows F1 and F2. The arrows F1 show that the flow comes to strike the ground, which risks stones being thrown up, hot air being returned which may be reingested by the engines, with a risk of damage thereto. Likewise, the flow reversed in the direction of the arrow F2 risks striking horizontal empennage 5 of the aircraft creating undesirable effects, particularly on handleability of the aircraft.

The system for guiding the streams of reversed gas according to the invention, with which it is assumed that the left-hand engine is equipped, makes it possible to eliminate these drawbacks. Thus, the lower doors of the reverser equipped with a guidance system G1 makes it possible to orient the reversed flow substantially in the direction of the arrows F4 along a path which is tangential to the ground and moves the flow away sidewards. The upper doors are equipped with a similar guidance system G2 which diverts the flow of its stream in the direction of an arrow F5 away from the horizontal empennage 5.

The system for guiding the layer will be described presently in more detail with reference to FIGS. 2 to 7. It is clear that this system may equip any type of door of a thrust reverser and applies to engines fixed not only, as in FIG. 1, under a wing structure but also to engines arranged at any other point on an aircraft, as seen in FIG. 9.

Figure 2:
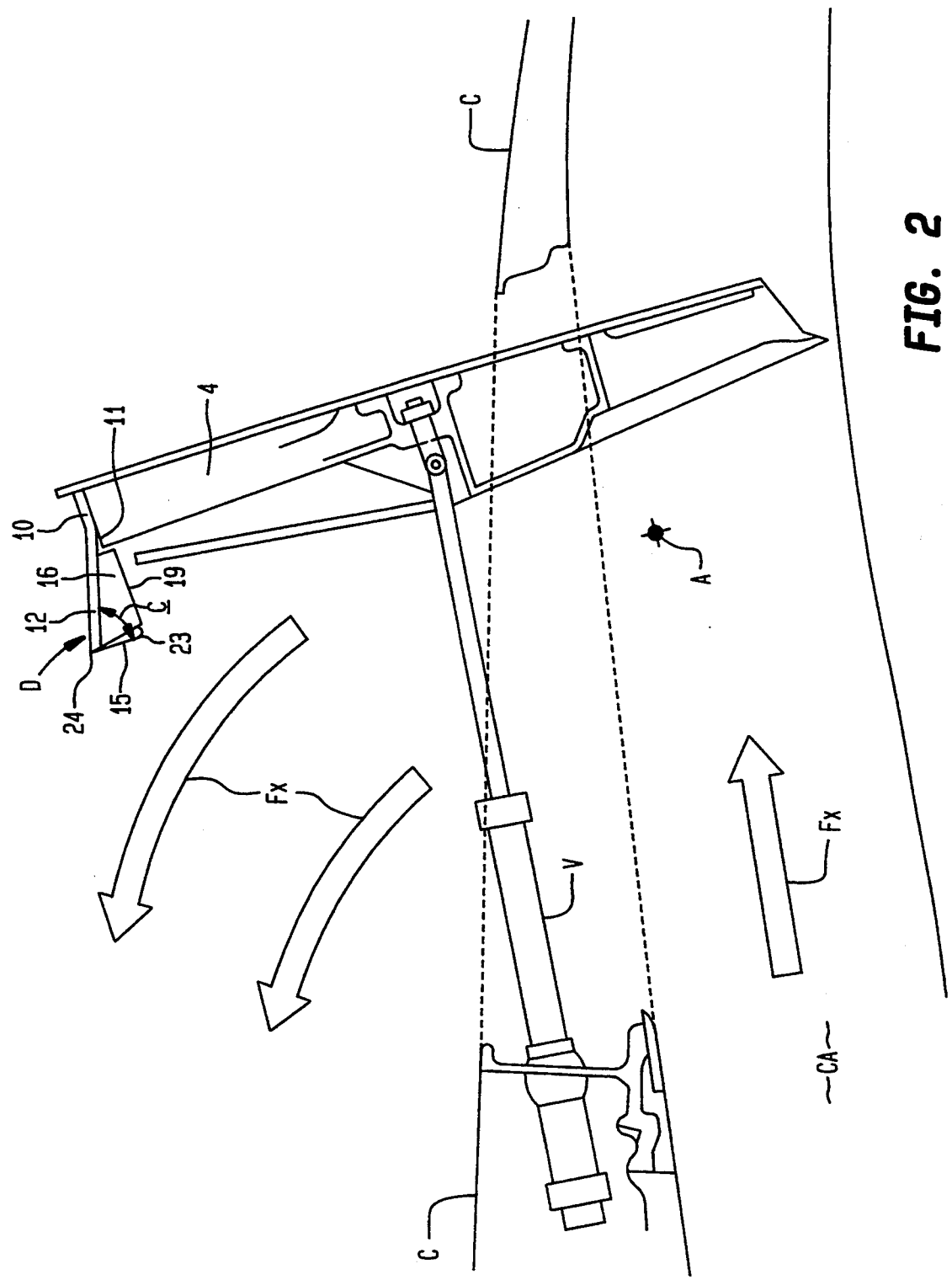
FIG. 2 represents, viewed from the side, a reverser door equipped with the deflecting structure according to the present invention.

As is well known, the thrust reverser consists of several doors 4 which are articulated so as to pivot about an axis A under the action of a control cylinder V between a cruising position in which the door is aligned with fairing parts C and in no way obstructs an annular duct CA, and a reversal position represented in solid line in FIG. 2 in which a downstream part of the door closes off the duct CA whilst its upstream part projects outward from the fairing so as to divert a stream Fx sidewards. In order to help with the reversal of the stream, the door 4 has, on its upstream edge 11, at least one frontal deflecting structure, or spoiler, denoted generally as D and extending beyond the internal face of the door.

The invention relates to the specific construction of this deflecting structure which allows sideward guidance of the diverted streamflow.

This deflecting structure, in the embodiment represented, which is given by way of non-limiting example, includes a sole plate 10 which is fixed (by welding, riveting or bolting) against the edge 11 of the door. At its ends, the sole plate is extended upward by two lateral members 12 and 13 (FIG. 3) which, together with the sole plate 10 form a U-shaped frame delimiting a space 14. Upper ends of the members 12 and 13 are capped or bridged by a transverse stiffener 15.

In the space 14 are housed vanes 16 which are profiled in the form of a wing, root 17 of which is fixed to the sole plate 10, and a tip 18 of which is fixed under the stiffener 15, the tip 18 being longer than the root 17. As is seen in FIG. 4, which is a plan view of FIG. 3, the vanes 16 are substantially parallel to each other and are inclined by an angle a with respect to the normal N to the sole plate, which angle may lie between 0° and 70° depending on the lateral orientation requirements of the diverted flow.

The rounded leading edge 19 of the vanes 16 is oriented toward the inside of the door, whereas their trailing edge 20 points outward, which trailing edge is located in the same plane as the sole plate 10 and the members 12, 13 of the deflecting structure.

Figure 3:
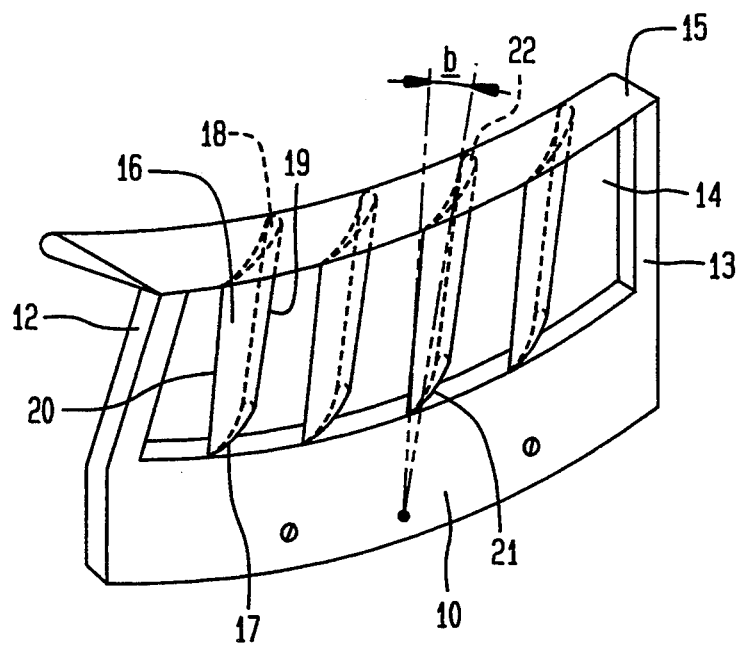
FIG. 3 is a perspective view of the deflecting structure.
Figure 4:
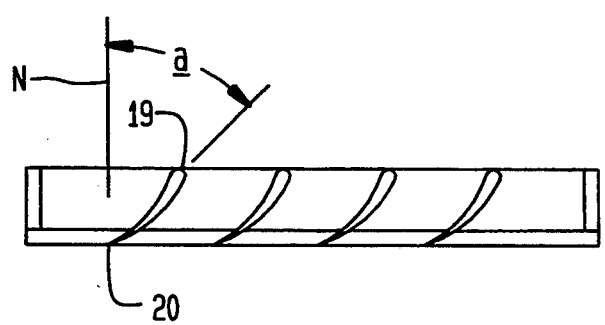
FIG. 4 is a plan view of the deflecting structure.
Figure 5:
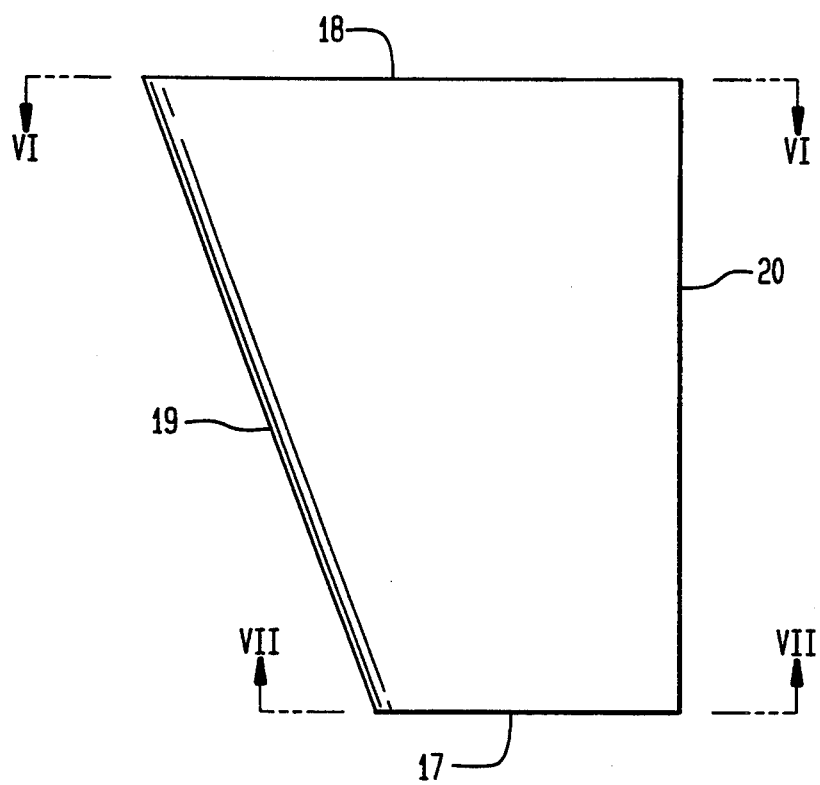
FIG. 5 is a side view of a vane.
Figure 6:
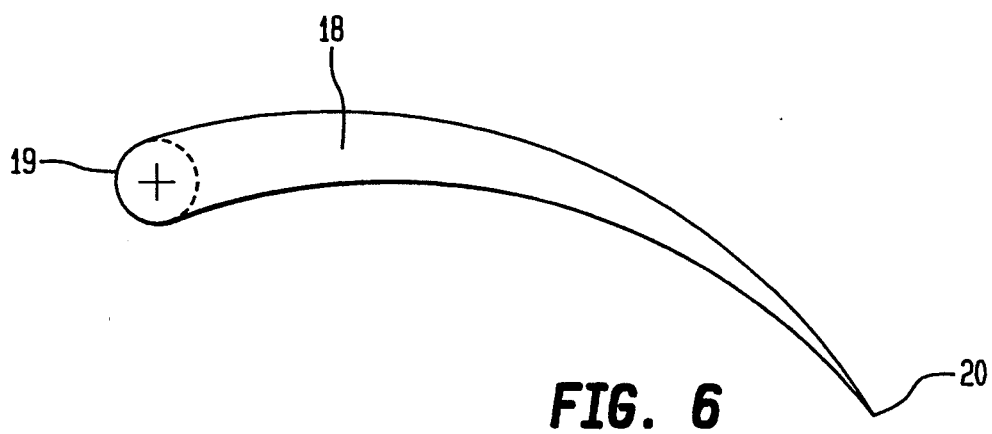
FIG. 6 and 7 are sectional views of each end of the vane of FIG. 5, respectively along the lines VI—VI and VII—VII.
Figure 7:
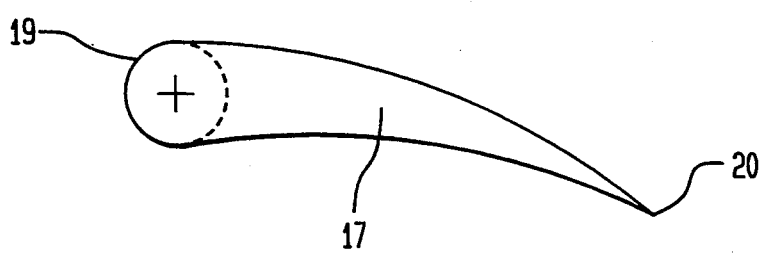

Moreover, as is seen in FIG. 3, the geometric center 21 of the root 17 of each vane is offset with respect to the geometric center 22 of the vane tip 18 by an angle b which may lie between 0° and 30°.

As is seen particularly in FIGS. 2, 5, 6 and 7, the vanes 16 have, viewed face on, a substantially trapezoidal form, their trailing edge 20 being more or less perpendicular to the root 17 and to the tip 18 of the vane, whereas their leading edge 19 is inclined. The vane root 17 is shorter than the vane tip 18.

The stiffener 15, for its part, may advantageously also have an aerodynamic cross section in the form of a wing with rounded leading edge 23 (FIG. 2) oriented toward the inside of the door and linear trailing edge 24 located in the same plane as the trailing edges of the vanes 16.

Finally, the angle c between the stiffener 15 and the plane of the U-shaped space 14 delimited by the frame 10, 11, 13 lies between 30° and 90°.

We claim:

1. In a thrust reverser for a jet engine mountable on an aircraft in spaced relationship therewith, the engine having a longitudinal axis and a forward flight direction, the engine comprising a central engine body and a peripheral cowling spaced away from the engine body to define with it an annular flow channel for cold air flow, the cowling provided with an inner air flow surface and an outer air flow surface, the cowling further provided with at least one lateral vent which is lateral relative to the longitudinal axis, the thrust reverser comprising in combination:

at least one thrust reversing door having an upstream edge, a downstream edge, an inner skin and an outer skin;

means for attaching the door pivotally to the cowling;

pivoting means for moving the door between a cruising position wherein the door closes the lateral vent and the inner skin and the outer skin constitute fairing elements with the inner and the outer air flow surfaces of the cowling respectively, whereby flows over said surfaces are unimpeded; and a thrust-reversal position wherein the door shuts the annular channel and the lateral vent is opened to divert the cold air flow sidewardly out through the lateral vent;

the thrust reversing door characterized in that it is provided on its said upstream edge with a deflecting structure projecting substantially perpendicularly to the door to guide a portion of the diverted cold air flow sidewardly relative to the longitudinal axis, the deflecting structure comprising in combination:

a sole plate attached fixedly to said upstream edge, a stiffener connected rigidly to and in spaced relationship from the sole plate to delimit therebetween a passage, a plurality of sidewardly oriented deflecting vanes each connected rigidly to the sole plate and to the stiffener in the passage.

2. The deflecting structure as claimed in claim 1, wherein said stiffener is integral with said sole plate.

3. The deflecting structure as claimed in claim 1, wherein said sole plate has two ends each having a lateral member connected rigidly thereto to form the passage as a planar U-shaped enclosure.

4. The deflecting structure as claimed in claim 1, wherein said sole plate has two ends each provided with a lateral member connected rigidly between the sole plate and the stiffener.

5. The deflecting structure as claimed in claim 1, wherein the deflecting vanes have an aerodynamic profile in the form of a wing each having a vane leading edge and a vane trailing edge, each of the vane leading edges oriented inwardly of the door to project into the lateral vent when the door is in said thrust-reversal position, the vane trailing edges located in a plane which also includes the sole plate and the stiffener.

6. The deflecting structure as claimed in claim 1, wherein the deflecting vanes are substantially parallel each to the other and normal to the sole plate, and the deflecting vanes are inclined by an angle a from said longitudinal axis of the engine, said angle a being between 0° and 70°.

7. The deflecting structure as claimed in claim 1, wherein each of the deflecting vanes has a proximal end connected to the sole plate and a distal end connected to the stiffener, the geometric center of each distal end is offset from the geometric center of each proximal end by an angle b, said angle b being between 0° and 30°.

8. The deflecting structure as claimed in claim 5, wherein the stiffener is provided with a cross section in a form of a wing having a rounded stiffener leading edge oriented inwardly of the door and a stiffener trailing edge located in the same plane as the vane trailing edges.

* * * * *